United States Patent
Loganathan et al.

(10) Patent No.: US 12,147,556 B2
(45) Date of Patent: Nov. 19, 2024

(54) PROVIDING DATA AS A SERVICE USING A MULTI-TENANT SYSTEM

(71) Applicant: Salesforce, Inc., San Francisco, CA (US)

(72) Inventors: Raveendrnathan Loganathan, Sammamish, WA (US); Srinivas Tirupati, Bothell, WA (US); Muralidhar Krishnaprasad, Seattle, WA (US)

(73) Assignee: Salesforce, Inc., San Francisco, CA (US)

( * ) Notice: Subject to any disclaimer, the term of this patent is extended or adjusted under 35 U.S.C. 154(b) by 333 days.

(21) Appl. No.: 17/827,553

(22) Filed: May 27, 2022

(65) Prior Publication Data

US 2023/0401327 A1 Dec. 14, 2023

(51) Int. Cl.
*G06F 16/27* (2019.01)
*G06F 21/62* (2013.01)

(52) U.S. Cl.
CPC .......... *G06F 21/6218* (2013.01); *G06F 16/27* (2019.01)

(58) Field of Classification Search
CPC ............................ G06F 16/27; G06F 21/6218
USPC ......................................................... 707/610
See application file for complete search history.

(56) References Cited

U.S. PATENT DOCUMENTS

| 2019/0318117 A1* | 10/2019 | Beecham ............ G06F 16/9024 |
| 2020/0356873 A1* | 11/2020 | Nawrocke ........... G06F 11/3409 |
| 2021/0004332 A1* | 1/2021 | Geri .................... G06F 12/0815 |

* cited by examiner

*Primary Examiner* — Robert W Beausoliel, Jr.
*Assistant Examiner* — Lauren Zannah Ganger
(74) *Attorney, Agent, or Firm* — Butzel Long

(57) ABSTRACT

A multi-tenant system processes tenant data stored in storage systems of the multi-tenant system as well as external data sources. The multi-tenant system creates objects including objects based on tenant data stored in the storage system of the multi-tenant system and objects based on data stored in the external data sources. The multi-tenant system provides access to the objects to an external system distinct from the multi-tenant system. The multi-tenant system receives requests to perform operations on objects from the external system. An operation performed on an object based on data stored in external data source results in one or more of accessing data required for the operation from the external data source or storing data modified by the operation in the external data source.

20 Claims, 4 Drawing Sheets

PROVIDING DATA AS A SERVICE USING A MULTI-TENANT SYSTEM

BACKGROUND

Field of Art

This disclosure relates in general to multi-tenant systems, and in particular to a providing data as a service based on a multi-tenant system.

Description of the Related Art

Organizations store and process large amount of data. The data is processed by transactional applications and analytical applications. The applications may use various processing techniques including artificial intelligence, machine learning, data mining, and so on. The data may be stored in databases, files, events logs and so on. The data is stored using storage systems managed in data centers, cloud platforms such as AMAZON, Google Cloud Platform, Microsoft's Azure platform, and so on. The same data may be used by various different applications. As a result, copies of data are made so that the data is accessible to readily available for each application. Making copies of data results in storage inefficiencies. For example, various systems may store several gigabytes or terabytes of data. Making copies of such large amount of data is computationally inefficient as well as inefficient from storage perspective. Furthermore, once data is copied the copies are difficult to update. For example, if the source data keeps changing in real time, the copies of data become outdated and may provide inaccurate results during downstream processing.

Figure 1:
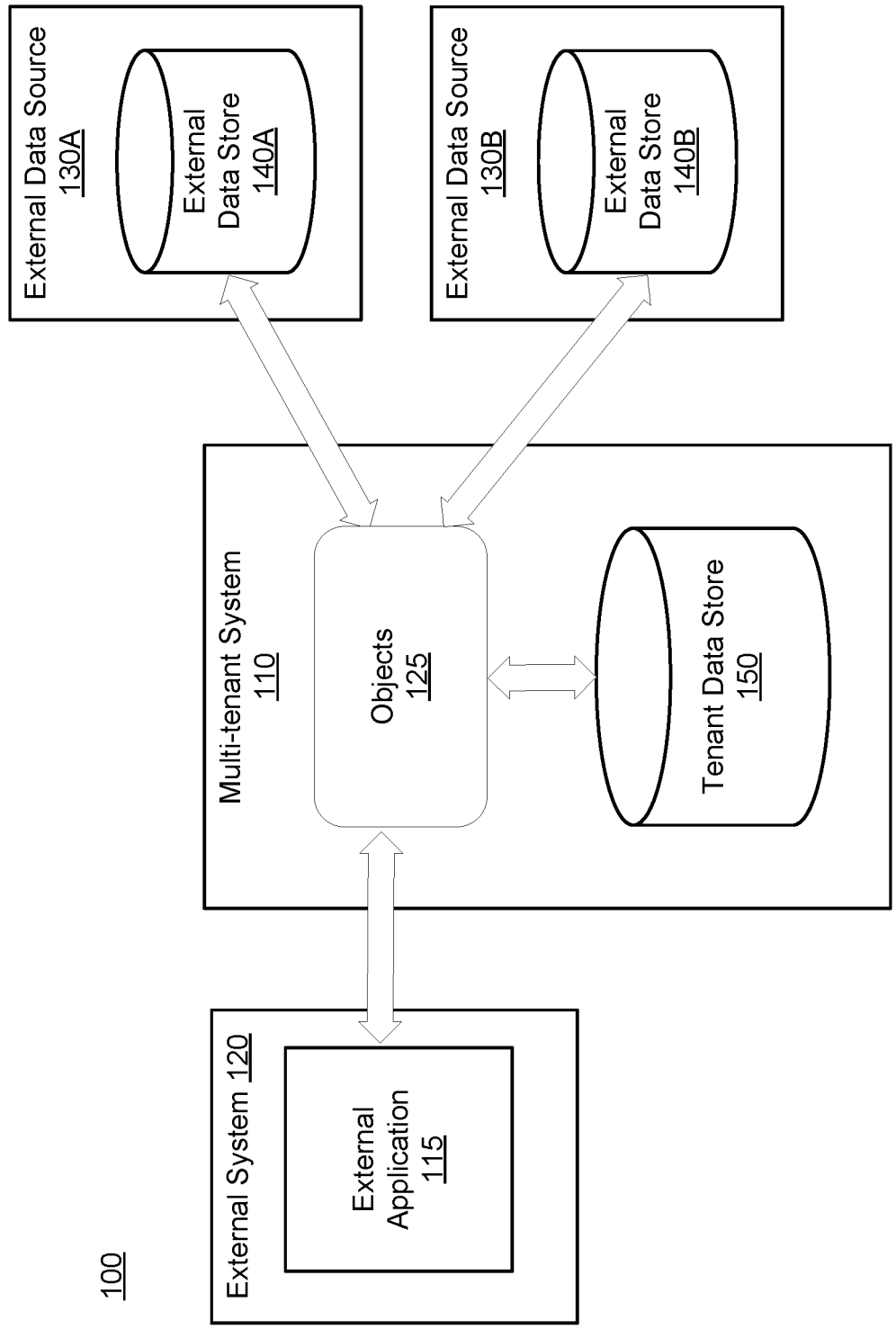
FIG. 1 is a block diagram of a system environment illustrating a multi-tenant system providing data as a service, according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral.

DETAILED DESCRIPTION

Embodiments of the invention provide data as a service using a multi-tenant system. The system provides applications with access to data of a tenant (referred to as tenant data) that may reside in the multi-tenant system or may reside in external data sources that are distinct from the multi-tenant system. The system allows tenants to build and execute applications in external systems that can access all the data via the data as a service provided by the multi-tenant system. These applications may be transactional that update the data or analytics applications that only read the data. The applications may use artificial intelligence techniques such as machine learning techniques and various analytics techniques. The multi-tenant system accesses the data stored in the external data source for every request made by the application without making a local copy of the data stored in the external data source. Accordingly, the data stored in the external data sources acts as a single source of truth. The multi-tenant system further tracks the life cycle of data, the usage of the data and performs access control of the data. The system provides real-time or near real-time access to the data. For example, if an application accesses the data multiple times within a short time interval and the data keeps changing in the external data source, each request sent by the application receives the latest data stored in the external data source. Accordingly, the multi-tenant system provides one or more of real-time, near real-time, and batch data access to data stored in external data sources.

According to an embodiment, the multi-tenant system stores tenant data for a tenant in storage systems of the multi-tenant system as well as external storage systems referred to as external data sources. The multi-tenant system receives metadata describing tenant data stored in an external system. The multi-tenant system creates objects comprising a set S1 of objects based on tenant data stored in the storage system of the multi-tenant system and a set S2 of objects based on data stored in the external data sources. An object of the set S2 is configured based on the metadata received from the corresponding external data source. The multi-tenant system provides access to the objects to an external system distinct from the multi-tenant system. For example, the external system may use the objects for artificial intelligence (AI) or machine learning (ML) based applications. The multi-tenant system receives from the external system, requests to perform operations on objects of the plurality of objects. An operation performed on an object from the set S2 of objects results in one or more of (1) accessing data required for the operation from the external data source or (2) storing data modified by the operation in the external data source. As a result, the multi-tenant system avoids making copy of the data stored in external data sources by directly accessing the data from the external data source even though it may be more efficient to store a local copy of the data. Accessing the data directly at the external data source allows the multi-tenant system to maintain a single source of truth of the data as the external data source. The multi-tenant system provides a real-time or near real-time data pipeline and platform for data ingestion, preparation, processing, and modeling for AI/ML driven insights for applications. Furthermore, the multi-tenant system provides metadata including semantic metadata describing the data along with the data. The semantic metadata allows the systems accessing the data to perform meaningful processing of the data. For example, an external system can determine how to display the data, how to process the data, and so on. The external data sources may emit transactional/operational data on a continuous basis. The multi-tenant system according to various embodiments provides real-time (e.g., milliseconds) and near real-time (e.g., 1-2 minutes) analytics and insights while preserving consistency of data relative to the data in external data sources.

System Environment

FIG. 1 is a block diagram of a system environment illustrating a multi-tenant system providing data as a service, according to an embodiment. The system environment 100 comprises a multi-tenant system 110, one or more external systems 120, and one or more external data sources 130. In other embodiments, the system environment 100 may include more or fewer components. An external data source may also be referred to herein as external storage system.

The multi-tenant system 110 stores data of a plurality of tenants. Each tenant may be associated with an enterprise or organization that represents a customer of the multi-tenant system 110. Each tenant may have multiple users that interact with the multi-tenant system via client devices. A tenant may store data in the storage systems that are managed by the multi-tenant systems, for example, the tenant data store 150. Examples of types of data stored in the multi-tenant data store includes organization entities, for example, contacts, products, users, opportunities, cases, accounts, and so on. The term 'entity' may also be used interchangeably herein with 'object'. An entity may represent an account representing a business partner or potential business partner (e.g., a client, vendor, distributor, etc.) of a user, and may include attributes describing a company, subsidiaries, or contacts at the company. As another example, an entity may represent a project that a user is working on, such as an opportunity (e.g., a possible sale) with an existing partner, or a project that the user is trying to get. An entity may represent an account representing a user or another entity associated with the enterprise. For example, an account may represent a customer of the first enterprise. An entity may represent a user of the online system.

The tenant data store 150 may store objects 125 representing tenant data. The multi-tenant system 110 loads the objects 125 as data structures in memory for efficient access to data stored in the objects 125 by external applications 115. An object has data fields that are defined by the structure of the object (e.g., fields of certain data types and purposes). For example, an object representing an entity may store information describing the potential customer, a status of the opportunity indicating a stage of interaction with the customer, and so on. An object representing an entity of entity type case may include attributes such as a date of interaction, information identifying the user initiating the interaction, description of the interaction, and status of the interaction indicating whether the case is newly opened, resolved, or in progress.

A tenant may process data obtained from an external data source 130A, 130B that is not managed by the multi-tenant system 110. Each external data source 130 may include one or more external data stores 140. For example, the external data source 130A includes external data store 140A and external data source 130B includes external data store 140B. Examples of external data stores include relational databases, data warehouses, external lake houses, file systems, big data systems, and so on. An external data source may be a web service that provides data/information such as. weather, traffic, events, demographic, location/address, search data, and so on.

An external system 120 access data stored in the tenant data store 150 for the tenant as well as external data sources 130. The external system 120 executes applications such as external applications 115. Examples of external applications 115 include artificial intelligence applications such as machine learning based applications or neural network based applications, analytics applications and so on. These applications are able to use the techniques disclosed herein to combine data stored in the tenant data store 150 with data stored in the external data sources 130. For example, an external application 115 can combine data stored in a CRM (customer relationship management) system managed by the multi-tenant system with data stored in an ERP (enterprise resource planning) system managed by an external data source 130. Such an application can use artificial intelligence data across multiple data sources to derive data insights. The multi-tenant system 110 provides real-time data federation with external data sources 130, without copying data from the external data sources 130 to the multi-tenant system 110.

An external data source 130 may store data in a cloud platform, for example, AWS (AMAZON WEB SERVICES), GOOGLE cloud platform, or MICROSOFT AZURE. The external data source 130 may represent a storage system in a data center managed by the enterprise or organization representing the tenant of the multi-tenant system 110. For example, backups and restore, security, compliance issues, access controls and so on for the external data source are not managed by the multi-tenant system and are managed independent of the multi-tenant system. For example, the user accounts used for accessing data and applications of the tenant on the multi-tenant system are distinct from the user accounts used for accessing data stored in the external data store 140 of the external data source 130. Furthermore, a user account of the tenant on the multi-tenant system that has access to data stored for the tenant in the tenant data store 150 may not have access to data stored in the external data store 140 of an external data source 130 unless the external data source 130 explicitly grants access to the user account.

With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

The multi-tenant system 110 may include a tenant data store 150 that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

A multi-tenant system may implement security protocols and access controls that keep data, applications, and application use separate for different tenants. In addition to user-specific data and tenant-specific data, the multi-tenant system may maintain system level data usable by multiple tenants or other data. Such system level data may include industry reports, news, postings, and the like that are sharable among tenants.

It is transparent to tenants that their data may be stored in a database that is shared with other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to provide data as a service.

System Architecture

Figure 2:
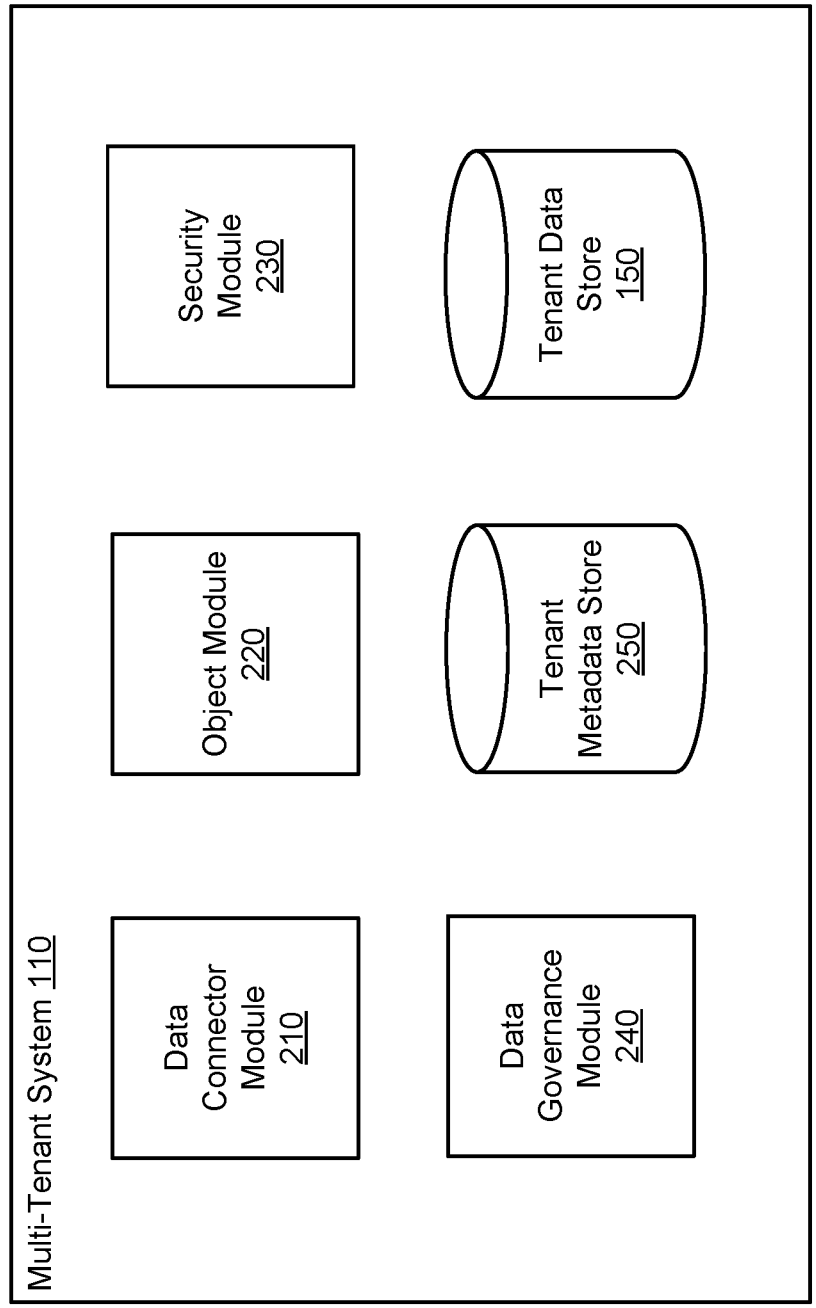
FIG. 2 is a block diagram illustrating the architecture of a multi-tenant system providing data as a service, according to one embodiment.

FIG. 2 is a block diagram illustrating the architecture of a multi-tenant system providing data as a service, according to one embodiment. The multi-tenant system 110 includes a data connector module 210, an object module 220, a security module 230, a data governance module 240, a tenant metadata store 250, and a tenant data store 150. Other embodiments can have different and/or other components than the ones described here, and that the functionalities can be distributed among the components in a different manner.

The data connector module 210 comprises data connectors for various types of external data sources 130. A data connector for a particular type of external data source includes the instructions for creating a session or connection with the external data source of that particular type and for accessing as well as send data to the external data source. For example, if the external data source is a database, the data connector may use JDBC (Java Database connectivity) or ODBC (open database connectivity) application programming interfaces (APIs) to create a database connection and interact with the database. In some embodiments, the external data source is a web service and the data connector module 210 uses the web service APIs to establish a session with the web service and interact with the web service.

The object module 220 creates and processes objects. As described herein, examples of types of objects stored includes organization entities such as, contacts, products, users, opportunities, cases, accounts, and so on. Accordingly, the object module 220 creates an object interface for underlying data. Since the multi-tenant system manages the data stored in the tenant data store 150, the multi-tenant system can determine the format in which the data is stored and processed for each object. Each external data source 130 provides metadata describing semantics of the data stored in the external data stores 140. The object module 220 uses the metadata describing the semantics of the data stored in the external data stores 140 to map individual data elements to attributes of objects. In some embodiments, the metadata provided by the external data source 130 provides mapping from data elements to attributes of objects The tenant metadata store 250 stores metadata describing each tenant. The tenant metadata store 250 may store information describing the tenant data, for example, a schema of the tenant data, various types of objects stored in the tenant data, and so on. The tenant metadata store 250 may store information describing various external data sources, credentials for accessing the external data sources, metadata describing the data stored in the external data sources, and so on. The external data sources provide the tenant metadata. The tenant metadata include semantic abstractions that provides ability to query data or map the data stored in the external data sources to objects 125.

The tenant metadata provides various types of functionalities. The tenant metadata may comprise semantic metadata like display/logical column names, views, and relationship between tables. The tenant metadata may comprise prescriptive table configuration such as target file size, file format, compression codec and so on. The tenant metadata may comprise certain constraints on file ingestion/writing, for example, allowing upserts (updates and inserts) only into append only tables, stream writes only to streaming tables, and so on. The tenant metadata may comprise object representations of tables in external data warehouse platforms. These representations may access the data stored in external data stores as tables using a JDBC connector. The multi-tenant system 110 decouples the external applications 115 from the underlying data representations of various external data sources and provides a consistent representation in the form of objects 125. An external system accessing the data from the multi-tenant system is able to access the latest data along with any semantic metadata describing the data. Although the semantic metadata is stored in the multi-tenant system, the multi-tenant system accesses the data directly from the external data sources so that any recent additions and modifications to the data are reflected in the data provided. According to an embodiment, the multi-tenant system analyzes the data being accessed to update the semantic metadata if necessary. For example, if there are semantic changes in the data being accessed, the multi-tenant system identifies the semantic changes and updates the semantic metadata stored. The semantic metadata describing a data from an external data source may be accessed using an API (application programming interface) for accessing the semantic metadata independent of the data. Alternatively, the multi-tenant system combines the semantic metadata with the data obtained from the external data source and provides as a single data stream or a data object or set of data objects.

The data governance module 240 manages authentication, lineage, auditing, privacy & compliance for data stored in tenant data store as well as external data sources that are connected to the multi-tenant system. The data governance module 240 manages security of tenant data stored in the tenant data store 150 of the multi-tenant system as well as tenant data that is stored in the external data sources 130.

The security module 230 provides security isolation for each tenant. In some embodiments, the security module 230 follows a public cloud security standard which requires that all data is encrypted in transit and at rest.

Overall Process

Figure 3:
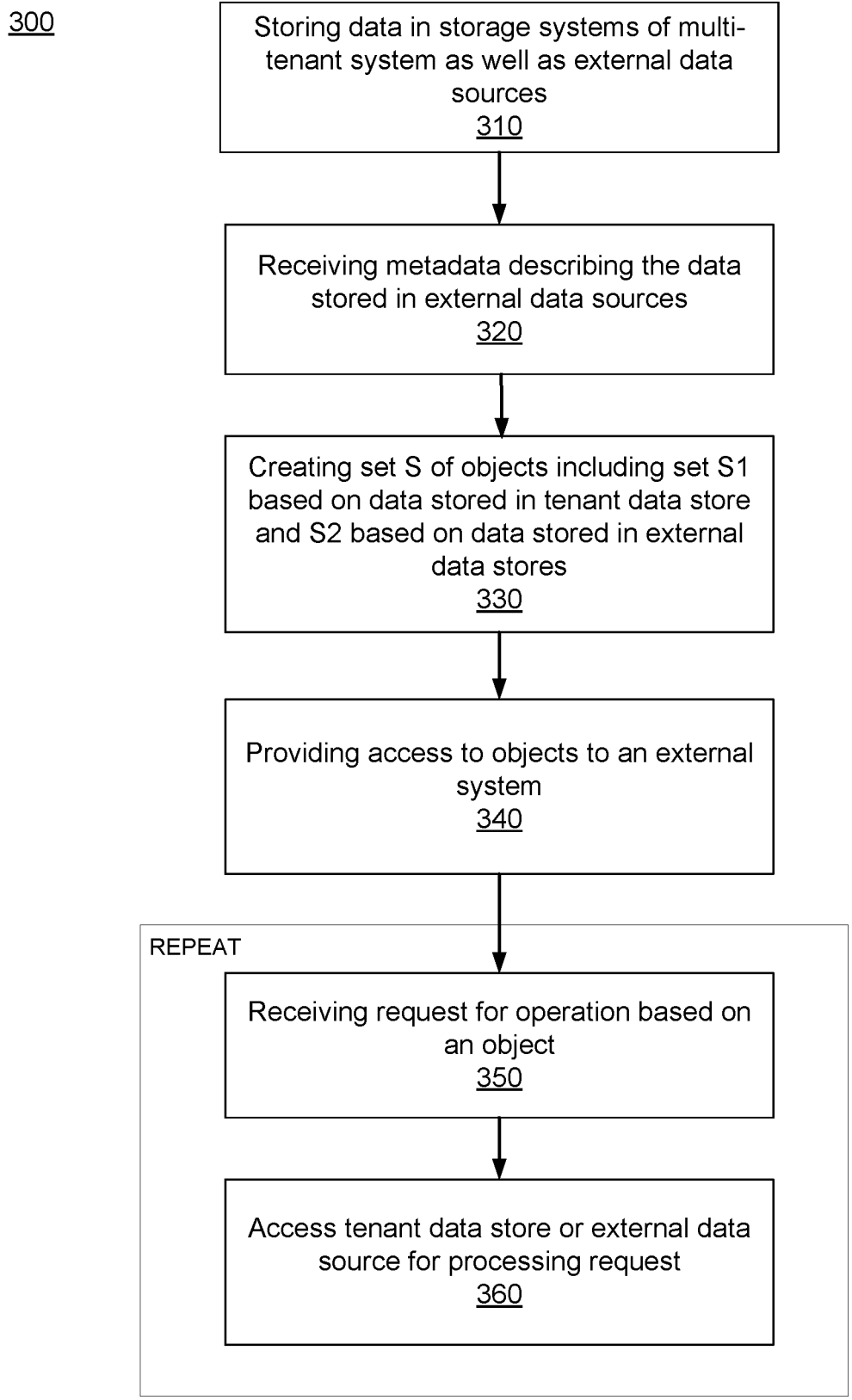
FIG. 3 shows the overall process for providing data as a service, according to an embodiment.

FIG. 3 shows the overall process 300 for providing data as a service, according to an embodiment. The steps shown in FIG. 3 may be executed in an order different from that indicated herein. For example, wherever possible, certain steps may be executed in parallel using multiple processors.

The multi-tenant system stores 310 tenant data for a tenant in storage systems of the multi-tenant system (for example, tenant data store 15) as well as external data stores 140 of external data sources 130. The multi-tenant system 110 receives 320 metadata describing tenant data stored in an external system. The metadata may describe semantics of the data stored in the external data store 140. In an embodiment, the metadata maps attributes of the data stored in the external data store 140 to attributes of objects 125 defined by the multi-tenant system 110.

The multi-tenant system 110 creates 330 a set S of objects. The set of objects includes some objects that are based on data stored in tenant data store and some objects based on data stored in external data stores. For example, the set S of objects includes a set S1 of objects such that their underlining data is stored in the storage system of the multi-tenant system (e.g., tenant data store 150), and a set of objects S2 such that their underlining data is stored in the external data stores of external data sources. The objects of the set S2 are created based on the tenant metadata received from the external data source. In an embodiment, the objects of set S2 do not store data values of attributes of the objects but simply store connection information and metadata necessary for accessing the data values from the corresponding external data sources. For objects of the set S1, the system may store the data values in the object and process the objects using the in-memory data. Accordingly, multiple interactions may be performed by the external applications with the object before the object is stored in the tenant data store.

The multi-tenant system provides 340 access to the set S of objects to an external application 115 running on an external system 120, for example, machine learning based applications. The multi-tenant system 110 repeats the step 350, 360 a number of times depending on the number of requests received from the external application. The multi-tenant system 110 receives a request to perform an operation on a particular object O of the set S of objects. If the object O is based on tenant data store, the multi-tenant system may keep the data for the object in-memory and access the tenant data store based on any caching policy. For example, the multi-tenant system may update the data stored in memory and periodically write the modified data to the tenant data store. In contrast, according to an embodiment, if an operation is performed on an object from the set S2 of objects, the multi-tenant system accesses the external data store when the operation is performed. For example, if a read operation is performed on an attribute of the object, the multi-tenant system accesses the external data store to get the value of a field of external data store corresponding to attribute of the object as part of the read operation. If a write operation is performed on an attribute of the object, the multi-tenant system accesses the external data store to update a field of external data store corresponding to the attribute of the object as part of the update operation. data required for the operation from the external data source or storing data modified by the operation in the external data source.

In some embodiments, the multi-tenant system caches the values of objects from the set S2 in memory for a very short period of time so that a set of operations may be performed on the object before the multi-tenant system synchronizes the value of the attributes of the object with corresponding fields of the external data source. However, the length of the time interval used to synchronize the data of objects of set S2 with external data stores is smaller than a length of the time interval used to synchronize the data of objects of set S1 with tenant data store.

In an embodiment, if an attribute is updated by an external application, the multi-tenant system determines whether the field corresponding to the attribute of the object was modified by another source resulting in write conflicts. In this situation, the multi-tenant system uses a predetermined conflict resolution technique, for example, by reporting the write conflict to an administrator.

Data Governance

The multi-tenant system performs governance of the data stored in external data sources. For example, the multi-tenant system determines lineage of data stored in the tenant data store combined with data stored in one or more external data stores. The multi-tenant system tracks the flow of data across the data stored in the tenant data store as well as any external data stores used by a tenant. The multi-tenant system records the changes made to the data and allows the changes to be traced to an origin of data. In an embodiment, the multi-tenant system receives information describing the lineage of data stored in an external data source and combines the information with a lineage of data determined from objects 125 stored for the tenant in the multi-tenant system. In an embodiment, the multi-tenant system receives a graph G1 representing lineage of data stored in an external data source. The multi-tenant system further determines a graph G2 representing lineage of data based on the objects 125 stored in the multitenant system. The multi-tenant system combines the graphs G1 and G2 to obtain a graph representing the overall lineage of the data across the tenant data store as well as the external data sources.

In an embodiment, the multi-tenant system allows access control policies of the multi-tenant system to be imposed on the data stored in external data sources when the data is accessed via APIs of the multi-tenant system that allow interactions with the data via the objects 125. For example, an external data source may implement a particular access control policy P1 that allows specific sets of users to access specific fields or portions of the external data store. However, the multi-tenant system is provided with credentials of the external data source, thereby allowing the multi-tenant system to access the data stored in the external data stores of the external data sources. If an application accesses the data of the external data stores using APIs supported by the multi-tenant system that allow access to the objects 125, a different access control policy P2 of the multi-tenant system is enforced on the data. Accordingly, the access control policy enforced when accessing the data using the APIs of the multi-tenant system may be different from an access control policy enforced when accessing the data of the external data sources directly, for example, using APIs of the external data source.

Computer Architecture

Figure 4:
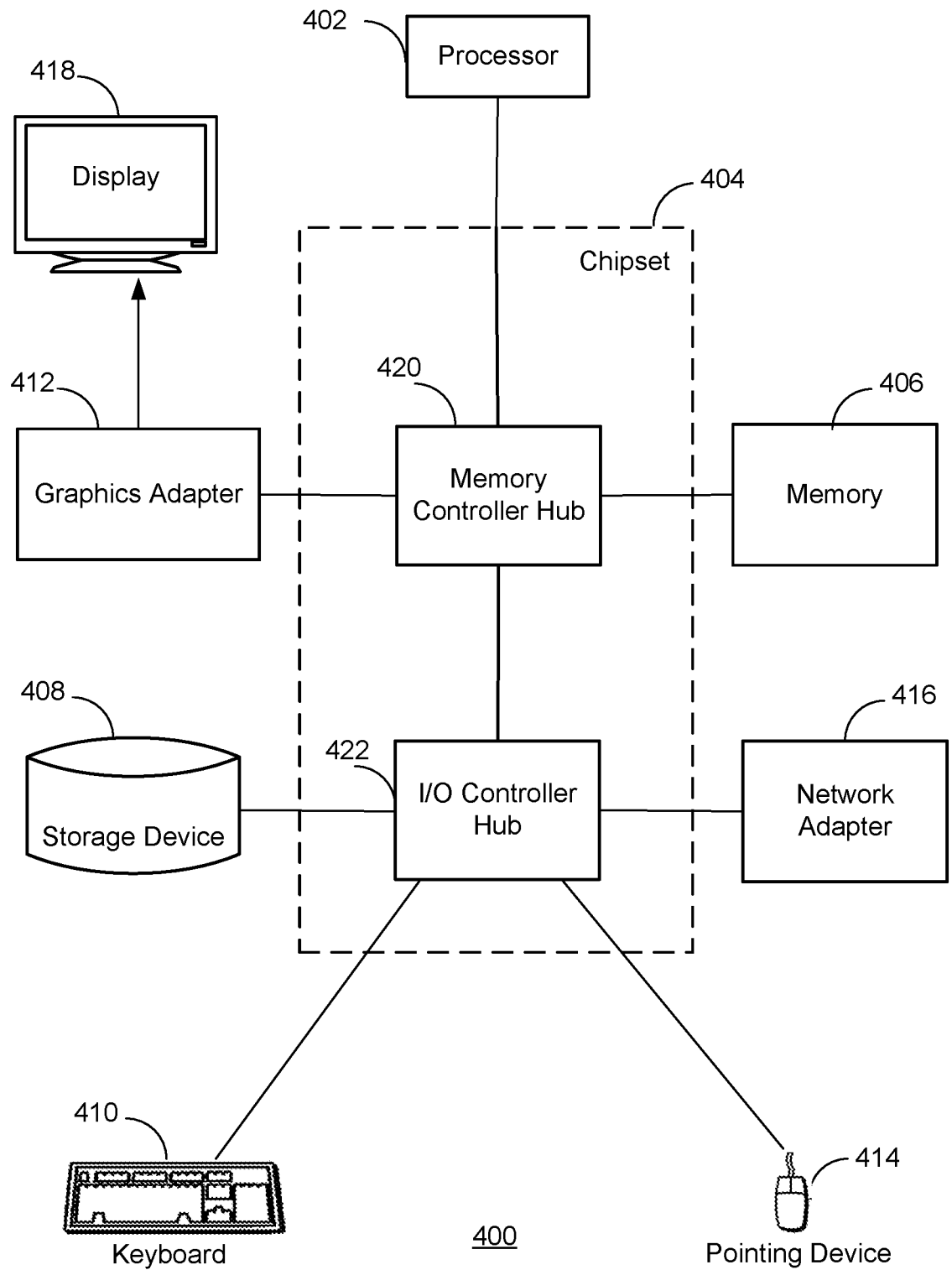
FIG. 4 is a block diagram illustrating a functional view of a typical computer system for use in the environment of FIG. 1 according to one embodiment.

FIG. 4 is a high-level block diagram illustrating a functional view of a typical computer system for use as one of the entities illustrated in the environment 100 of FIG. 1 according to an embodiment. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is a non-transitory computer-readable storage medium, such as a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the computer system 400. The graphics adapter 412 displays images and other information on the display 418. The network adapter 416 couples the computer system 400 to a network.

As is known in the art, a computer 400 can have different and/or other components than those shown in FIG. 4. In addition, the computer 400 can lack certain illustrated components. For example, a computer system 400 acting as a multi-tenant system 110 may lack a keyboard 410 and a pointing device 414. Moreover, the storage device 408 can be local and/or remote from the computer 400 (such as embodied within a storage area network (SAN)).

The computer 400 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 408, loaded into the memory 406, and executed by the processor 402.

The types of computer systems 400 used by the entities of a system environment can vary depending upon the embodiment and the processing power used by the entity. For example, a client device may be a mobile phone with limited processing power, a small display 418, and may lack a pointing device 414. A multi-tenant system or a cloud platform, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

What is claimed is:

1. A computer implemented method for providing data as a service based on a multi-tenant system, the method comprising:

storing by the multi-tenant system, tenant data for a tenant in one or more storage systems of the multi-tenant system and one or more external data sources;

receiving by the multi-tenant system, metadata describing tenant data stored in an external system;

creating a plurality of objects comprising a first set of objects based on tenant data stored in the storage system of the multi-tenant system and a second set of objects based on data stored in the external data source, wherein an object of the second set is configured based on the metadata received from the external data source, and wherein the metadata describes semantics of the data stored in the external data source to map individual data elements to attributes of one or more of the second set of objects;

providing access to the plurality of objects to an external system distinct from the multi-tenant system; and receiving, by the multi-tenant system from the external system, requests to perform operations on objects of the plurality of objects, wherein an operation performed on an object from the second set of objects comprises one or more of accessing data required for the operation from the external data source or storing data modified by the operation in the external data source.

2. The computer implemented method of claim 1, further comprising:

responsive to determining that the operation performed on the object of the second set is a read of an attribute of the object, determining, based on the metadata, a field of an external data store of the external data source, the field mapped to the attribute of the object; and sending a request to the external data source to provide a value of the field of the external data store.

3. The computer implemented method of claim 1, further comprising:

responsive to determining that the operation performed on the object of the second set is an update of an attribute of the object, determining, based on the metadata, a field of an external data store of the external data source, the field mapped to the attribute of the object; and sending a request to the external data source to update a value of the field of the external data store based on the updated value of the attribute of the object.

4. The computer implemented method of claim 1, further comprising:

enforcing a first access control policy on the data stored in the external data source if the data is accessed via the objects of the second set, wherein the first access control policy is distinct from an access control policy enforced by the external data source if the data is accessed directly from the external data source.

5. The computer implemented method of claim 1, further comprising:

implementing a first caching policy on the objects of the first set of objects and a second caching policy on the objects of the second set of objects, wherein the second caching policy synchronizes data of an object with data stored in the external data source at a higher frequency compared to a frequency at which the first caching policy synchronizes data stored in an object of the first set with data stored in a tenant data store of the multi-tenant system.

6. The computer implemented method of claim 1, further comprising:

determining lineage of data that tracks data across tenant data stored in tenant data store and data stored in one or more external data sources.

7. The computer implemented method of claim 6, wherein determining lineage of data comprises:

receiving a first graph representing of lineage of data stored in an external data source;

determining a second graph representing of lineage of data represented by a set of objects; and combining the first graph with the second graph to determine a representation of lineage of the data across the tenant data store and the external data source.

8. A non-transitory computer readable storage medium for storing instructions that when executed by a computer processor cause the computer processor to perform steps comprising:

storing by a multi-tenant system, tenant data for a tenant in one or more storage systems of the multi-tenant system and one or more external data sources;

receiving by the multi-tenant system, metadata describing tenant data stored in an external system;

creating a plurality of objects comprising a first set of objects based on tenant data stored in the storage system of the multi-tenant system and a second set of objects based on data stored in the external data source, wherein an object of the second set is configured based on the metadata received from the external data source, and wherein the metadata describes semantics of the data stored in the external data source to map individual data elements to attributes of one or more of the second set of objects;

providing access to the plurality of objects to an external system distinct from the multi-tenant system; and receiving, by the multi-tenant system from the external system, requests to perform operations on objects of the plurality of objects, wherein an operation performed on an object from the second set of objects comprises one or more of accessing data required for the operation from the external data source or storing data modified by the operation in the external data source.

9. The non-transitory computer readable storage medium of claim 8, wherein the instructions further cause the processor to perform steps comprising:

responsive to determining that the operation performed on the object of the second set is a read of an attribute of the object, determining, based on the metadata, a field of an external data store of the external data source, the field mapped to the attribute of the object; and sending a request to the external data source to provide a value of the field of the external data store.

10. The non-transitory computer readable storage medium of claim 8, wherein the instructions further cause the processor to perform steps comprising:

responsive to determining that the operation performed on the object of the second set is an update of an attribute of the object, determining, based on the metadata, a field of an external data store of the external data source, the field mapped to the attribute of the object; and sending a request to the external data source to update a value of the field of the external data store based on the updated value of the attribute of the object.

11. The non-transitory computer readable storage medium of claim 8, wherein the instructions further cause the processor to perform steps comprising:

enforcing a first access control policy on the data stored in the external data source if the data is accessed via the objects of the second set, wherein the first access control policy is distinct from an access control policy enforced by the external data source if the data is accessed directly from the external data source.

12. The non-transitory computer readable storage medium of claim 8, wherein the instructions further cause the processor to perform steps comprising:
implementing a first caching policy on the objects of the first set of objects and a second caching policy on the objects of the second set of objects, wherein the second caching policy synchronizes data of an object with data stored in the external data source at a higher frequency compared to a frequency at which the first caching policy synchronizes data stored in an object of the first set with data stored in a tenant data store of the multi-tenant system.

13. The non-transitory computer readable storage medium of claim 8, wherein the instructions further cause the processor to perform steps comprising:
determining lineage of data that tracks data across tenant data stored in tenant data store and data stored in one or more external data sources.

14. The non-transitory computer readable storage medium of claim 13, wherein instructions for determining lineage of data further cause the processor to perform steps comprising:
receiving a first graph representing of lineage of data stored in an external data source;
determining a second graph representing of lineage of data represented by a set of objects; and
combining the first graph with the second graph to determine a representation of lineage of the data across the tenant data store and the external data source.

15. A computer system comprising:
a computer processor; and
a non-transitory computer readable storage medium for storing instructions that when executed by the computer processor, cause the computer processor to perform steps comprising;
storing by a multi-tenant system, tenant data for a tenant in one or more storage systems of the multi-tenant system and one or more external data sources;
receiving by the multi-tenant system, metadata describing tenant data stored in an external system;
creating a plurality of objects comprising a first set of objects based on tenant data stored in the storage system of the multi-tenant system and a second set of objects based on data stored in the external data source, wherein an object of the second set is configured based on the metadata received from the external data source, and wherein the metadata describes semantics of the data stored in the external data source to map individual data elements to attributes of one or more of the second set of objects;
providing access to the plurality of objects to an external system distinct from the multi-tenant system; and
receiving, by the multi-tenant system from the external system, requests to perform operations on objects of the plurality of objects, wherein an operation performed on an object from the second set of objects comprises one or more of accessing data required for the operation from the external data source or storing data modified by the operation in the external data source.

16. The computer system of claim 15, wherein the instructions further cause the processor to perform steps comprising:
responsive to determining that the operation performed on the object of the second set is a read of an attribute of the object, determining, based on the metadata, a field of an external data store of the external data source, the field mapped to the attribute of the object; and
sending a request to the external data source to provide a value of the field of the external data store.

17. The computer system of claim 15, wherein the instructions further cause the processor to perform steps comprising:
responsive to determining that the operation performed on the object of the second set is an update of an attribute of the object, determining, based on the metadata, a field of an external data store of the external data source, the field mapped to the attribute of the object; and
sending a request to the external data source to update a value of the field of the external data store based on the updated value of the attribute of the object.

18. The computer system of claim 15, wherein the instructions further cause the processor to perform steps comprising:
enforcing a first access control policy on the data stored in the external data source if the data is accessed via the objects of the second set, wherein the first access control policy is distinct from an access control policy enforced by the external data source if the data is accessed directly from the external data source.

19. The computer system of claim 15, wherein the instructions further cause the processor to perform steps comprising:
implementing a first caching policy on the objects of the first set of objects and a second caching policy on the objects of the second set of objects, wherein the second caching policy synchronizes data of an object with data stored in the external data source at a higher frequency compared to a frequency at which the first caching policy synchronizes data stored in an object of the first set with data stored in a tenant data store of the multi-tenant system.

20. The computer system of claim 15, wherein the instructions further cause the processor to perform steps comprising:
determining lineage of data that tracks data across tenant data stored in tenant data store and data stored in one or more external data sources, the determining lineage comprising:
receiving a first graph representing of lineage of data stored in an external data source;
determining a second graph representing of lineage of data represented by a set of objects; and
combining the first graph with the second graph to determine a representation of lineage of the data across the tenant data store and the external data source.

* * * * *